United States Patent
Kawaguchi

(10) Patent No.: US 8,882,359 B2
(45) Date of Patent: Nov. 11, 2014

(54) WHEEL ROLLING BEARING UNIT

(75) Inventor: Kouji Kawaguchi, Izumi (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 13/981,498

(22) PCT Filed: Feb. 9, 2012

(86) PCT No.: PCT/JP2012/052982
§ 371 (c)(1),
(2), (4) Date: Jul. 24, 2013

(87) PCT Pub. No.: WO2012/108508
PCT Pub. Date: Aug. 16, 2012

(65) Prior Publication Data
US 2013/0301970 A1  Nov. 14, 2013

(30) Foreign Application Priority Data
Feb. 9, 2011  (JP) ................. 2011-026447

(51) Int. Cl.
*F16C 33/66* (2006.01)
*F16C 33/40* (2006.01)
*F16C 33/41* (2006.01)
*F16C 33/38* (2006.01)
*F16C 19/18* (2006.01)
*B60B 27/00* (2006.01)

(52) U.S. Cl.
CPC ........... *F16C 33/6607* (2013.01); *F16C 33/405* (2013.01); *F16C 2326/02* (2013.01); *B60B 27/0005* (2013.01); *F16C 33/6629* (2013.01); *F16C 33/6681* (2013.01); *F16C 33/414* (2013.01); *F16C 33/3806* (2013.01); *F16C 33/3843* (2013.01); *F16C 19/186* (2013.01)

USPC ........... 384/544; 384/470; 384/477; 384/504; 384/523

(58) Field of Classification Search
CPC .................. F16C 33/6681; B60B 27/0005
USPC ......... 384/462, 470, 477, 490, 504, 512, 523, 384/529, 533, 538, 544, 609, 614; 277/345
See application file for complete search history.

(56) References Cited

U.S. PATENT DOCUMENTS 3,743,369 A * 7/1973 Langstrom .................... 384/470
4,019,791 A * 4/1977 Loberg .......................... 384/526

(Continued)

FOREIGN PATENT DOCUMENTS

| JP | A-2004-116715 | 4/2004 |
| JP | A-2006-329218 | 12/2006 |
| JP | A-2008-008464 | 1/2008 |

OTHER PUBLICATIONS

International Search Report issued in Application No. PCT/JP2012/052982; Dated Apr. 17, 2012 (With Translation).

*Primary Examiner* — Marcus Charles
(74) *Attorney, Agent, or Firm* — Oliff PLC

(57) ABSTRACT

A wheel rolling bearing unit capable of preventing grease leak even if the interference of the sealing member for sealing the clearance between the inner and outer rings is made small. The wheel rolling bearing unit according to the present invention is equipped with an inner shaft; an outer ring disposed concentrically on the outer peripheral side of the inner shaft; a plurality of balls disposed between these; and a pair of cages for retaining the balls in the circumferential direction. On the inner peripheral surface of each of the pair of cages, a concave section being dented to the outside in the radial direction to hold grease is formed in the range from the axial outside end section to the inside end section.

5 Claims, 3 Drawing Sheets

(56) References Cited

U.S. PATENT DOCUMENTS

| | | | |
|---|---|---|---|
| 4,106,827 A * | 8/1978 | Ducret et al. | 384/482 |
| 4,150,553 A * | 4/1979 | Aucktor | 464/178 |
| 4,398,775 A * | 8/1983 | Hofmann et al. | 384/484 |
| 4,647,230 A * | 3/1987 | Friedrich et al. | 384/504 |
| 4,655,617 A * | 4/1987 | Yasui et al. | 384/470 |
| 4,723,851 A * | 2/1988 | Troster et al. | 384/523 |
| 4,822,183 A * | 4/1989 | Lederman | 384/607 |
| 5,174,538 A * | 12/1992 | Okada | 248/349.1 |
| 5,863,124 A * | 1/1999 | Ouchi et al. | 324/207.25 |
| 6,045,267 A * | 4/2000 | Merklein et al. | 384/448 |
| RE36,804 E * | 8/2000 | Kajihara et al. | 384/470 |
| 7,121,632 B2 * | 10/2006 | Grabaum | 384/544 |

\* cited by examiner

Prior Art

WHEEL ROLLING BEARING UNIT

CROSS-REFERENCE TO RELATED APPLICATIONS

This is a national stage application of International Application No. PCT/JP2012/052982 filed Feb. 9, 2012, and this application claims priority to Japanese Application No. JP2011-026447 filed Feb. 9, 2011. The disclosures of the prior applications are hereby incorporated by reference in their entirety.

TECHNICAL FIELD

The present invention relates to a wheel rolling bearing unit for supporting a wheel of a vehicle.

BACKGROUND ART

A wheel rolling bearing unit for supporting a wheel is used for a vehicle, such as an automobile. This wheel rolling bearing unit is in some cases equipped with an inner shaft 101 having a flange 100 on which a brake rotor and a wheel of a vehicle are mounted; an outer ring 102 secured to the side of the vehicle and disposed concentrically with the inner shaft 101; a plurality of balls 103 rotatably arranged in double rows between the inner shaft 101 and the outer ring 102; sealing members 104 for hermetically sealing the annular clearance formed between the inner shaft 101 and the outer ring 102; and cages 105 for retaining the plurality of balls 103 at predetermined intervals in the circumferential direction as shown in FIG. 5 (for example, refer to Patent Document 1).

Grease for lubrication is sealed between the inner and outer rings of the above-mentioned wheel rolling bearing unit. The sealing member 104 has an annular seal lip which is secured to the side of the outer ring and the tip end of which is pressed to the outer peripheral surface of the inner shaft 101 and is made slide contact therewith, and this seal lip hermetically seals the annular clearance formed between the inner and outer rings, thereby preventing the grease from leaking to the outside.

In the above-mentioned wheel rolling bearing unit, if grease leak occurs from the sealing member 104 on the side of the flange, there is a danger that the leaked grease may flow along the flange 100 and be attached to the brake rotor. Hence, to prevent grease leak, measures have been taken, for example, the interference of the sealing member 104 (the level of the pressing force at the seal lip) is set so as to be relatively large to further enhance the hermetic sealing performance of the sealing member 104.

PRIOR ART DOCUMENT

Patent Document

Patent Document 1: JP-A-2004-116715

SUMMARY OF THE INVENTION

Problem that the Invention is to Solve

In recent years, from the viewpoint of economic efficiency and energy saving, the above-mentioned wheel rolling bearing unit is increasingly demanded to have lower rotation torque.

To meet this demand, a measure is conceived in which the interference of the sealing member 104, having been set to large for preventive purposes, is made as small as possible to reduce the friction between the sealing member 104 and the inner shaft 101; however, there is a concern that grease leak may occur as described above.

Accordingly, a measure capable of preventing grease leak even if the interference of the sealing member 104 is made small to reduce the rotation torque has been desired.

The present invention is made in consideration of these circumstances, and it is an object of the present invention to provide a wheel rolling bearing unit capable of preventing grease leak even if the interference of the sealing member for sealing the clearance between the inner and outer rings is made small.

Means for Solving the Problem

According to the invention, there is provided a wheel rolling bearing unit comprising: an inner ring member, one end of which a flange on which a wheel is mounted is formed; an outer ring member disposed concentrically on an outer peripheral side of the inner ring member; a plurality of rolling elements arranged in double rows and disposed between the inner ring member and the outer ring member; a pair of cages disposed along both rows of the plurality of rolling elements to retain the rolling elements in a circumferential direction; and sealing members for hermetically sealing openings at both ends of an annular space formed between the inner ring member and the outer ring member in which grease for lubricating the respective members has been introduced, characterized in that, on an inner peripheral surface of each of the pair of cages, a concave section being dented to the outside in a radial direction to hold the grease is formed in a range from an outside end section to an inside end section in an axial direction.

Advantage of the Invention

As described above, according to the wheel rolling bearing unit according to the present invention, grease leak can be prevented even if the interference of the sealing member for sealing the clearance between the inner and outer rings is made small.

MODES FOR CARRYING OUT THE INVENTION

Figure 1:
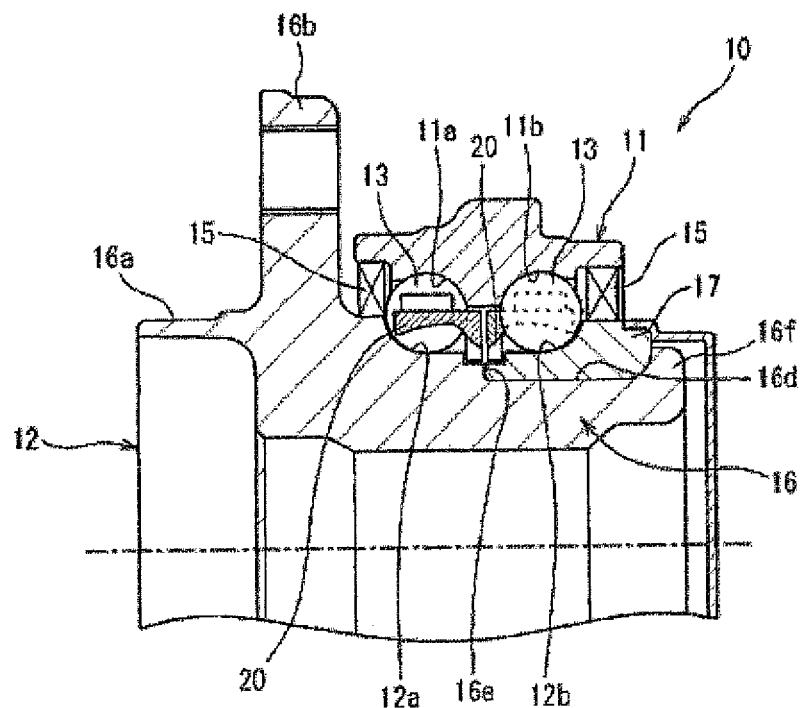
FIG. 1 is a cross-sectional view showing a configuration of a wheel rolling bearing unit according to an embodiment of the present invention.

Next, a preferred embodiment according to the present invention will be described referring to the accompanying drawings. FIG. 1 is a cross-sectional view showing a configuration of a wheel rolling bearing unit according to an embodiment of the present invention. This wheel rolling bearing unit 10 is used as an apparatus for rotatably supporting a wheel of a vehicle, such as an automobile.

The wheel rolling bearing unit 10 is equipped with an inner shaft 12 serving as an inner ring member; an outer ring 11 serving as an outer ring member disposed concentrically on the outer peripheral side of the inner shaft 12; balls 13 serving as a plurality of rolling elements arranged in double rows and disposed rotatably between the outer ring 11 and the inner shaft 12; a pair of sealing members 15 for hermetically sealing the openings at both ends of the annular space formed between the outer ring 11 and the inner shaft 12; a pair of cages 20 for retaining the balls 13 in the circumferential direction, thereby constituting a double row angular contact ball bearing.

Of these, the inner shaft 12 constitutes an axle on which a wheel, not shown, is mounted, and is composed of the combination of an inner shaft element 16 and an annular member 17.

On one end side, the inner shaft element 16 is equipped with a spigot joint section 16a and a flange section 16b for mounting a wheel. To the flange section 16b, a plurality of hub bolts (not shown) for tightening a wheel are fixed.

Furthermore, on the outer peripheral surface of the inner shaft element 16, a first inner ring raceway 12a is formed, and on the other end side of the inner shaft element 16, a small-diameter section 16d having a diameter smaller than that of the inner ring raceway 12a is formed. On this small-diameter section 16d, the annular member 17 formed into an annular shape is fitted in a press-fitted state.

On the outer peripheral surface of the annular member 17, a second inner raceway 12b is formed. The annular member 17 is press-fitted in a state in which one end surface thereof is in contact with the a stepped section 16e through which the outer peripheral surface of the inner shaft element 16 is connected to the small-diameter section 16d; furthermore, the annular member is secured to the inner shaft element 16 so as to be rotatable integrally by a calked section 16f that is formed by calking the tip end section of the small-diameter section 16d.

First and second outer ring raceways 11a and 11b opposed to the first and second inner ring raceways 12a and 12b are formed on the inner peripheral surfaces of the outer ring 11, whereby the outer ring 11 rotatably supports the inner shaft 12 via the balls 13.

The outer ring 11 is secured to a suspension device, and the like on the side of a vehicle by a mounting flange (not shown) formed on the outer peripheral surface thereof. Hence, the wheel rolling bearing unit 10 is mounted on the vehicle.

The sealing member 15 has an annular seal lip (not shown) which is secured to the side of the outer ring 11 and the tip end of which is pressed to the outer peripheral surface of the inner shaft 12 and is made slide contact therewith, and this seal lip hermetically seals the openings at both ends of the annular space formed between the outer ring 11 and the inner shaft 12 in which grease for lubricating the respective members has been introduced, thereby preventing the grease from leaking to the outside.

Figure 2:
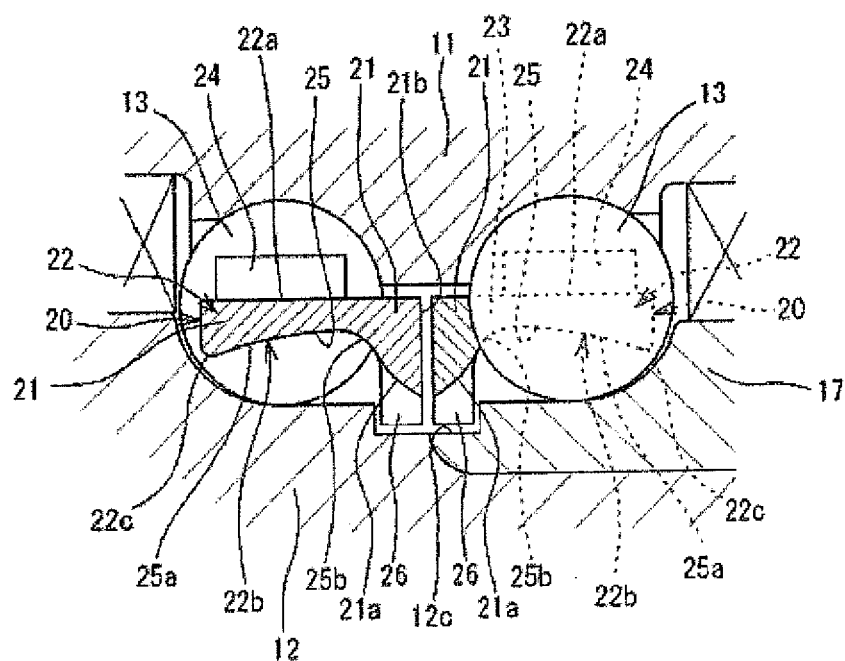
FIG. 2 is an enlarged cross-sectional view showing the main portion of FIG. 1.

FIG. 2 is an enlarged cross-sectional view showing the main portion of FIG. 1.

The cages 20 used as a pair are annular members made of a resin or the like, and the axial inside end surfaces thereof are abutted against each other and disposed in a state of being engaged with a peripheral groove 12c provided in the inner shaft 12 as described later. The cages 20 are disposed along both rows of the balls 13 arranged in double rows and retain the balls 13 at equal intervals in the circumferential direction.

Each cage 20 has an annular section 21 and a plurality of arm sections 22 protruding from the annular section 21 to the outside in the axial direction. Hence, the tip ends of the arm sections 22 are positioned on the outside of the cage 20 in the axial direction, and the annular section 21 is positioned at the axial inside end section of the cage 20.

The side surfaces of the arm section 22 are each formed into a shape along the outer peripheral surface of the ball 13, and a pocket 23 for retaining the ball 13 is formed between the arm sections 22 adjacent to each other. Hence, the balls 13 are retained by the arm sections 22 at equal intervals in the circumferential direction.

Furthermore, on the outer peripheral surface 22a of each arm section 22, a claw section 24 making slide contact with the outer peripheral surface of the ball 13 is formed to stably retain the ball 13.

Moreover, on the inner peripheral surface 22b of each arm section 22, a concave section 25 being dented to the outside in the radial direction to hold grease is formed. Since this concave section 25 is formed in all the arm sections 22, a groove shape being dented in the circumferential direction is formed.

The concave section 25 is configured to include an inclined surface 25a inclined so as to be expanded in diameter gradually from the axial outside end section 22c of the inner peripheral surface 22b of the arm section 22 to the inside in the axial direction and a curved surface 25b for connecting the axial inside end of the inclined surface 25a to the end surface of the annular section 21. Hence, the concave section 25 is formed so as to extend from the axial outside end section 22c to the annular section 21 positioned at the axial inside end section.

The annular sections 21 are disposed in a state in which the inside end surfaces 21b thereof are abutted against each other. The inner peripheral surface 21a of the annular section 21 is formed into a curved surface inclined so as to be reduced in diameter gradually from the outside to the inside in the axial direction.

Figure 3:
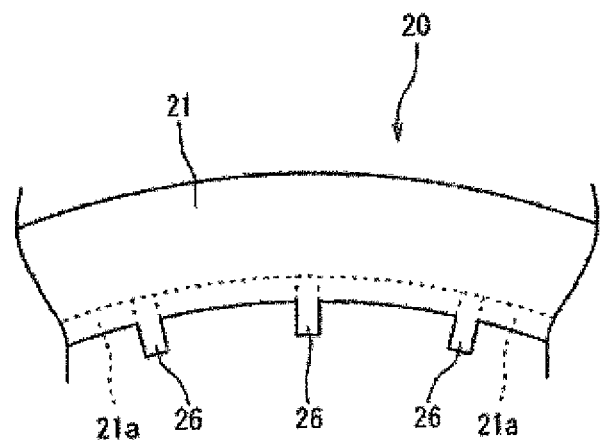
FIG. 3 is a partial external view showing a cage, viewed from the side of the annular section thereof in the axial direction.

FIG. 3 is a partial external view showing the cage 20, viewed from the side of the annular section 21 in the axial direction.

Referring to FIGS. 2 and 3, on the inner peripheral surface 21a of the annular section 21, protrusion sections 26 engaged with the level difference section of the peripheral groove 12c formed in the outer peripheral surface of the inner shaft 12 so that the cage 20 is held in the axial direction are formed. The protrusion sections 26, plural in number, are arranged at equal intervals in the circumferential direction and provided so as to protrude from the inner peripheral surface 21a to the inside in the radial direction.

In this embodiment, since the protrusion sections 26 engaged with the peripheral groove 12c in a state in which the axial inside annular sections 21 are abutted against each other are formed on the cages 20, the rotation of the cages 20 can be stabilized.

With the wheel rolling bearing unit 10 configured as described above, since the concave section 25 being dented to the outside in the radial direction is formed on the inner peripheral surface 22b of each arm section 22 of the pair of cages 20, in the case that the inner shaft 12 rotates and grease is attached to the inner peripheral surface 22b due to the centrifugal force of the rotation, the grease is liable to remain on the inner peripheral surface 22b at the bottom of the concave section 25 which has the largest inner circumferential diameter and to which the largest centrifugal force is exerted. Hence, the grease attached to the inner peripheral surface 22b is suppressed from being shaken off from the outside end section 22c of the cage 20 toward the outside in the axial direction; furthermore, when the grease attached to the inner peripheral surface 22b increases in amount to the extent that the grease cannot remain inside the concave section 25, the grease is returned to the inside in the radial direction, thereby lubricating various sections again. Hence, the grease can be circulated between the inner peripheral surface 22b of the cage 20 and the outer peripheral surface of the inner shaft 12, and the grease can be suppressed from flowing to the outside in the axial direction. As a result, grease leak can be prevented even if the interference of the sealing member 15 for hermetically sealing the clearance between the inner ring and the outer ring is made small.

Besides, with the embodiment, the rotation torque of the wheel rolling bearing unit 10 can be reduced by decreasing the interference of the sealing member 15.

Furthermore, in the embodiment, since the concave section 25 is configured to include the inclined surface 25a inclined so as to be expanded in diameter gradually from the axial outside end section 22c in the inner peripheral surface 22b of the cage 20 to the inside in the axial direction, the grease remaining in the concave section 25 can be shaken off toward the inside in the radial direction, whereby the grease can be circulated between the inner peripheral surface 22b of the cage 20 and the outer peripheral surface of the inner shaft 12 more securely.

Moreover, in the embodiment, since the protrusion sections 26 engaged with the level difference section of the peripheral groove 12c formed in the outer peripheral surface of the inner shaft 12 so that the cage 20 is held in the axial direction are formed on the annular section 21 serving as the axial inside end section of the cage 20, even if the grease is returned from the inner peripheral surface 22b of the cage 20 to the inner peripheral side in the radial direction and remains in the peripheral groove 12c, the grease inside the peripheral groove 12c can be scraped out using the protrusion sections 26 moving inside the peripheral groove 12c by virtue of the rotation of the cage 20, whereby the grease can be circulated efficiently.

Still further, since the axial outside end edge of the inner peripheral surface 21a of the annular section 21 of the cage 20 is formed so as to be larger in diameter than the outer peripheral surface of the inner shaft 12, the grease in the peripheral groove 12c to be scraped out using the protrusion sections 26 is discharged quickly to the outside of the peripheral groove 12c.

Figure 4:
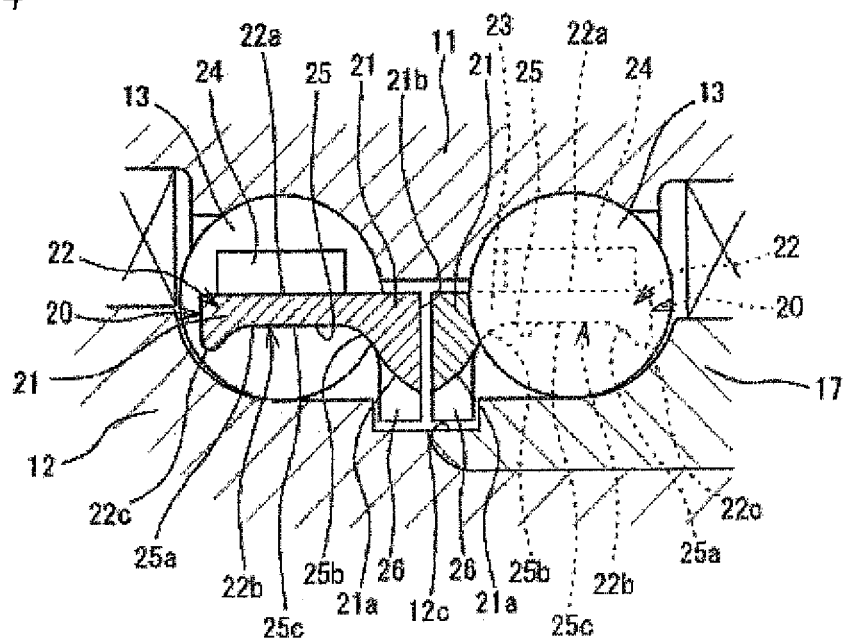
FIG. 4 is a cross-sectional view showing another example of the cage.
Figure 5:
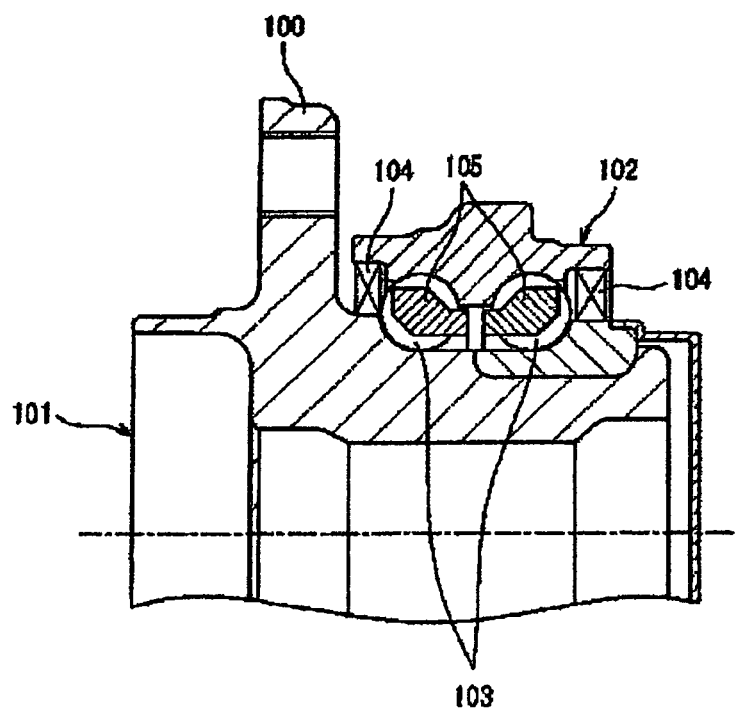
FIG. 5 is a cross-sectional view showing the conventional wheel rolling bearing unit.

The present invention is not limited to the above-mentioned embodiment. Although a case in which the concave section 25 formed in the inner peripheral surface 22b of the cage 20 is configured to include the inclined surface 25a inclined so as to be expanded in diameter gradually from the axial outside end section 22c of the arm section 22 to the inside in the axial direction and the curved surface 25b for connecting the axial inside end of the inclined surface 25a to the side surface of the annular section 21 has been described in the above-mentioned embodiment, the concave section 25 should only be formed so as to be dented to the outside in the radial direction in the range from the axial outside end section 22c of the inner peripheral surface 22b of the cage 20 to the inside end section thereof; for example, as shown in FIG. 4, the concave section may be configured via a flat bottom surface 25c formed in the axial direction between the inclined surface 25a and the curved surface 25b.

What's more, although a case in which the cage 20 is made of a resin has been exemplified in the above-mentioned embodiment, the cage can be made of metal, such as steel plate, copper or aluminum.

Still further, although a case in which the present invention is applied to a double row angular contact ball bearing has been exemplified in the above-mentioned embodiment, the present invention can also be applied to a double row cylindrical roller bearing and a double row tapered roller bearing, for example.

INDUSTRIAL APPLICABILITY

With the wheel rolling bearing unit according to the present invention, grease leak can be prevented even if the interference of the sealing member for sealing the clearance between the inner and outer rings is made small.

DESCRIPTION OF REFERENCE NUMERALS AND SIGNS 10 wheel rolling bearing unit
11 outer ring (outer ring member)
12 inner shaft (inner ring member)
12c peripheral groove
13 roller (rolling element)
15 sealing member
20 cage
22b inner peripheral surface
22c axial outside end section
25 concave section
25a inclined surface
26 protrusion section

The invention claimed is:

1. A wheel rolling bearing unit comprising:
an inner ring member including a flange on one end, a wheel being mountable to the flange;
an outer ring member disposed concentrically on an outer peripheral side of the inner ring member so that an annular space is formed between the inner ring member and the outer ring member, the annular space including openings at opposed ends;
a plurality of rolling elements arranged in double rows and disposed between the inner ring member and the outer ring member;
a pair of cage segments disposed circumferentially within the annular space along the double rows of the plurality of rolling elements to retain the rolling elements in a circumferential direction;
sealing members configured to hermetically seal the openings at the opposed ends of the annular space, grease for lubricating the respective members having been introduced into the annular space; and
a concave section and a convex section provided on an inner peripheral surface of each of the cage segments, the concave section forming a dent oriented toward an outside of the wheel rolling bearing unit in a radial direction to hold the grease, wherein
the dent is formed from an outside end section to an inside end section in an axial direction, and
the convex section of each of the cage segments extends radially from the dent and the convex sections are adjacent to each other.

2. The wheel rolling bearing unit according to claim 1, wherein the concave section includes an inclined surface inclined so as to expand in diameter gradually from the outside end section in the inner peripheral surface of the cage segment to the inside end section in the axial direction.

3. The wheel rolling bearing unit according to claim 1, wherein, at the inside end section of the cage segment in the axial direction, a protrusion section is engaged with a level difference section of a peripheral groove formed in an outer peripheral surface of the inner ring member so that the cage segment is held in the axial direction.

4. The wheel rolling bearing unit according to claim 2, wherein, at the inside end section of the cage segment in the axial direction, a protrusion section is engaged with a level difference section of a peripheral groove formed in an outer peripheral surface of the inner ring member so that the cage segment is held in the axial direction.

5. The wheel rolling bearing unit according to claim 1, wherein the concave section is formed in a range from the outside end section to the inside end section of each cage segment in the axial direction, the outside end section and the inside end section being on opposite sides of a center of the rolling element.

* * * * *